United States Patent
Asami

(10) Patent No.: US 11,789,437 B2
(45) Date of Patent: Oct. 17, 2023

(54) PROCESSING APPARATUS AND PROCESSING METHOD FOR PROCESSING PORTION

(71) Applicant: CANON KABUSHIKI KAISHA, Tokyo (JP)

(72) Inventor: Koji Asami, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 964 days.

(21) Appl. No.: 16/506,176

(22) Filed: Jul. 9, 2019

(65) Prior Publication Data

US 2020/0033844 A1    Jan. 30, 2020

(30) Foreign Application Priority Data

Jul. 24, 2018  (JP) .................................. 2018-138894
Jun. 12, 2019  (JP) .................................. 2019-109202

(51) Int. Cl.
G06F 17/00 (2019.01)
G05B 23/02 (2006.01)
G05B 19/05 (2006.01)
B25J 9/16 (2006.01)
G05B 19/42 (2006.01)
G06F 16/35 (2019.01)
(Continued)

(52) U.S. Cl.
CPC ............ *G05B 23/0283* (2013.01); *B25J 9/16* (2013.01); *G05B 19/05* (2013.01); *G05B 19/42* (2013.01); *G06F 16/35* (2019.01); *G06F 18/23* (2023.01); *G06V 10/762* (2022.01); *G06V 20/10* (2022.01)

(58) Field of Classification Search
CPC .... G05B 23/0283; G05B 19/05; G05B 19/42; G05B 23/024; B25J 9/16; B25J 19/02; G06F 16/35; G06F 18/23; G06K 9/6218; G06V 10/762; G06V 2201/06; G06V 20/10

See application file for complete search history.

(56) References Cited

U.S. PATENT DOCUMENTS

| 4,802,224 A | 1/1989 | Shiraki et al. |
| 2003/0009276 A1* | 1/2003 | Isobe .................... F02D 41/222 701/114 |

(Continued)

FOREIGN PATENT DOCUMENTS

| CN | 102693627 A | 9/2012 |
| CN | 107273726 A | 10/2017 |

(Continued)

OTHER PUBLICATIONS

Liao, T. Warren. "Clustering of time series data—a survey." Pattern recognition 38.11 (2005): 1857-1874 (Year: 2005).*

(Continued)

*Primary Examiner* — Andrew T Mcintosh
(74) *Attorney, Agent, or Firm* — VENABLE LLP

(57) ABSTRACT

A processing apparatus includes a processing portion. The processing portion obtains, in time series, a sensor value of a first sensor output from a predetermined apparatus including the first sensor in correspondence with an operation of the predetermined apparatus, sectionalizes the sensor value of the first sensor on a basis of a predetermined condition, and clusters the sectionalized sensor value of the first sensor.

34 Claims, 7 Drawing Sheets

(51) Int. Cl.
*G06F 18/23* (2023.01)
*G06V 10/762* (2022.01)
*G06V 20/10* (2022.01)

(56) References Cited

U.S. PATENT DOCUMENTS

| | | | |
|---|---|---|---|
| 2006/0082944 A1* | 4/2006 | Koyanagi | H02H 3/04 |
| | | | 361/93.1 |
| 2012/0209430 A1* | 8/2012 | Igarashi | B25J 9/1697 |
| | | | 901/30 |
| 2016/0003349 A1* | 1/2016 | Kimura | B60K 23/02 |
| | | | 701/68 |
| 2016/0123238 A1* | 5/2016 | Kay | F01D 9/041 |
| | | | 415/118 |
| 2018/0025062 A1 | 1/2018 | Choi | |
| 2018/0264613 A1* | 9/2018 | Tamai | B23Q 17/007 |
| 2018/0373980 A1* | 12/2018 | Huval | G06K 9/6254 |
| 2019/0099886 A1* | 4/2019 | Chattopadhyay | G05B 23/024 |
| 2019/0375171 A1* | 12/2019 | Choi | G05B 19/41875 |

FOREIGN PATENT DOCUMENTS

| | | |
|---|---|---|
| JP | 63-123105 | 5/1988 |
| JP | 5-77143 | 3/1993 |
| JP | 2005-279834 A | 10/2005 |
| JP | 56-84941 B1 | 3/2015 |
| JP | 2015-88078 A | 5/2015 |
| JP | 2016-168650 A | 9/2016 |
| JP | 2017-192990 A | 10/2017 |
| JP | 2018-105782 A | 7/2018 |
| KR | 10-2018-0010664 A | 1/2018 |
| WO | 2017/022784 A1 | 2/2017 |
| WO | 2017/090098 | 6/2017 |

OTHER PUBLICATIONS

Li, Xingyan, and Lynne E. Parker. "Sensor analysis for fault detection in tightly-coupled multi-robot team tasks." Proceedings 2007 IEEE International Conference on Robotics and Automation. IEEE, 2007 (Year: 2007).*
Verma, Vandi, et al. "Real-time fault diagnosis [robot fault diagnosis]." IEEE Robotics & Automation Magazine 11.2 (2004): 56-66 (Year: 2004).*
Park, Daehyung, Yuuna Hoshi, and Charles C. Kemp. "A multimodal anomaly detector for robot-assisted feeding using an lstm-based variational autoencoder." IEEE Robotics and Automation Letters 3.3 (2018): 1544-1551 (Year: 2018).*
Korean Office Action dated Feb. 26, 2022 issued in related Korean Application No. 10-2019-0083565 (with English language translation).
Chinese Office Action dated Sep. 27, 2022 issued in related Chinese Application No. 201910671756.1 (with English language translation).
Japanese Office Action dated Apr. 18, 2023 issued in related Japanese Application No. 2019-109202 (with English language translation).

* cited by examiner i=1,2,3,4,5,6

PROCESSING APPARATUS AND PROCESSING METHOD FOR PROCESSING PORTION

BACKGROUND OF THE INVENTION

Field of the Invention

The present invention relates to technology of a processing apparatus.

Description of the Related Art

Improving the efficiency of maintenance is a problem for an apparatus that moves such as an articulated robot arm. For example, in the case where the robot arm malfunctions due to breakage of a reduction gear, a bearing, or the like thereof, the robot arm is repaired by stopping the manufacture line. Therefore, it is desired that maintenance of the apparatus is performed in a regular checkup before malfunction of the apparatus occurs.

Japanese Patent Laid-Open No. 63-123105 discloses a method of obtaining a reference value by causing an apparatus in a normal condition to operate, and predicting malfunction of the apparatus on the basis of deviation of a measured value from the reference value. Japanese Patent Laid-Open No. 5-77143 discloses a method of setting a simulation result of an apparatus as a reference value and predicting malfunction of the apparatus on the basis of deviation of a measured value from the reference value.

There are a plurality of kinds of operations of an apparatus. Taking a robot arm as an example, there are two kinds of known operations. The first is an operation that is repetitively performed and is the same each time such as teaching/playback control. The second is an operation that is different each time such as random picking control using a visual sensor or force control using a force sensor. A series of operations of the robot arm is realized by the combination of these two kinds of operations.

Incidentally, it is preferable to change the method for predicting malfunction of the apparatus depending on the kind of operation of the subject apparatus. For example, in the case of a robot arm, the method disclosed in Japanese Patent Laid-Open No. 63-123105 is preferable for teaching/playback control, and the method disclosed in Japanese Patent Laid-Open No. 5-77143 is preferable for random picking control and force control. However, a processing apparatus used for predicting the malfunction of the apparatus is not necessarily capable of receiving information indicating what kind of operation the subject apparatus performs.

SUMMARY OF THE INVENTION

According to a first aspect of the present invention, a processing apparatus includes a processing portion. The processing portion obtains, in time series, a sensor value of a first sensor output from a predetermined apparatus including the first sensor in correspondence with an operation of the predetermined apparatus, sectionalizes the sensor value of the first sensor on a basis of a predetermined condition, and clusters the sectionalized sensor value of the first sensor.

According to a second aspect of the present invention, a processing method for a processing portion includes obtaining, in time series, a sensor value of a first sensor output from a predetermined apparatus including the first sensor in correspondence with an operation of the predetermined apparatus, sectionalizing the sensor value of the first sensor on a basis of a predetermined condition, and clustering the sectionalized sensor value of the first sensor.

Further features of the present invention will become apparent from the following description of exemplary embodiments with reference to the attached drawings.

DESCRIPTION OF THE EMBODIMENTS

Figure 1:
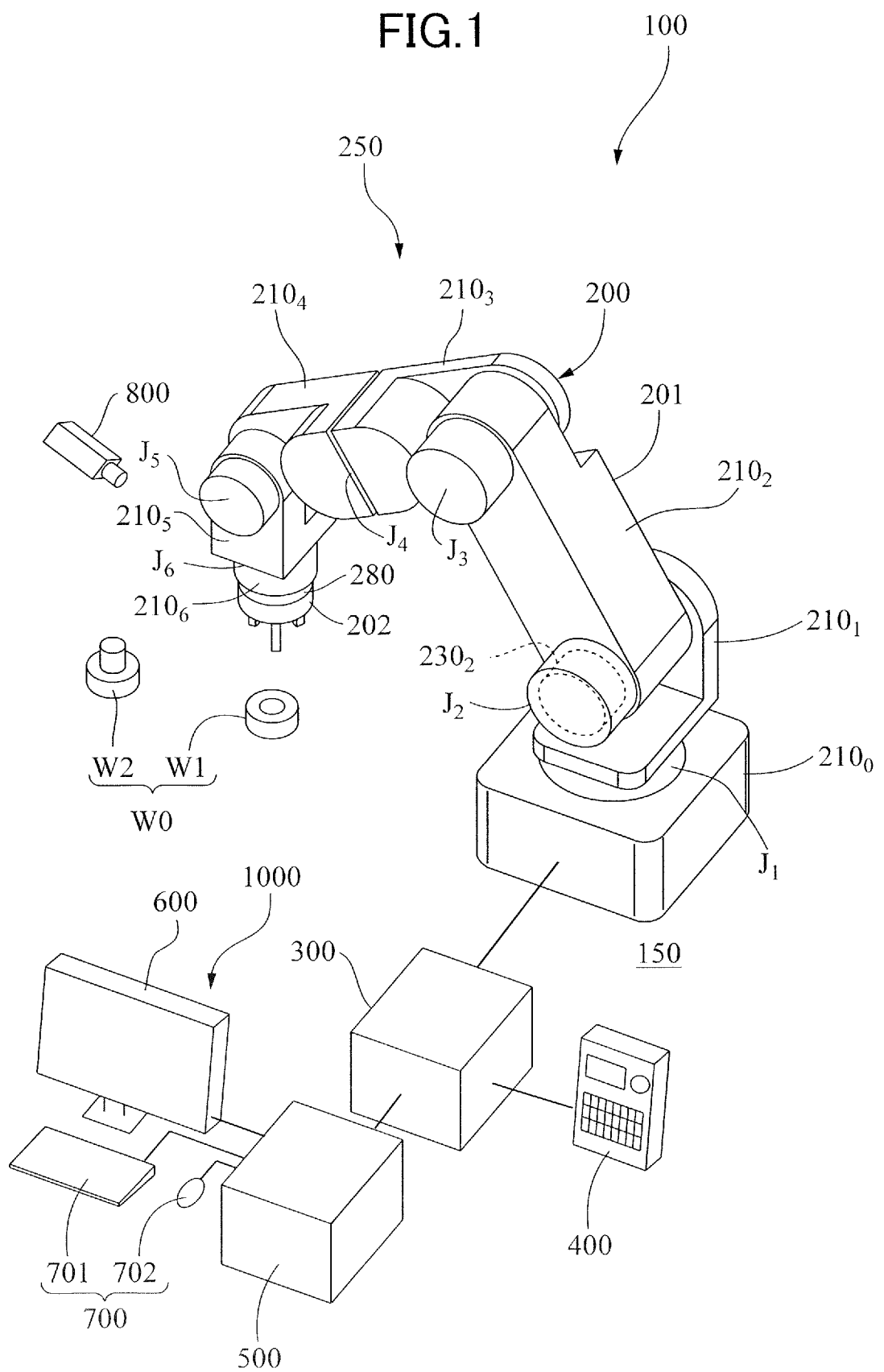
FIG. 1 is a schematic perspective view of a robot apparatus serving as an example of a manufacturing system according to an exemplary embodiment.

An exemplary embodiment of the present invention will be described in detail below with reference to drawings. FIG. 1 is a schematic perspective view of a robot apparatus 100 serving as an example of a manufacturing system according to the exemplary embodiment. The robot apparatus 100 includes a robot 250, a teaching pendant 400, a processing apparatus 1000, and a visual sensor 800. The robot 250 is a manufacturing robot that performs assembly operation and the like. The processing apparatus 1000 includes a processing apparatus main part 500, a display apparatus 600, and an input device 700. The display apparatus 600 is an example of a device that issues warning to a user by a sound, an image, a sentence, or the like.

The robot 250 includes an articulated robot arm 200 that is a manipulator, and a robot controller 300 that controls the robot arm 200. The robot arm 200 is an example of a predetermined apparatus, and an example of a manufacturing apparatus. The robot controller 300 causes the robot arm 200 to perform an operation of mounting a workpiece W1 serving as a first workpiece on a workpiece W2 serving as a second workpiece to manufacture a product W0. The robot arm 200 includes an arm body 201 and a hand 202 serving as an example of an end effector provided at a distal end of the arm body 201. The hand 202 is a distal end portion of the robot arm 200. The hand 202 is a holding portion capable of holding an object, for example, the workpiece W1, a part, a tool, a jig, or a camera. A force sensor 280 is provided between the arm body 201 and the hand 202.

The robot controller 300, the robot arm 200, the teaching pendant 400, and the processing apparatus main part 500 are communicably interconnected. The processing apparatus main part 500 and the robot controller 300 are interconnected by, for example, a local area network: LAN in a factory. The robot arm 200 is fixed to a top surface 150 of a base. The teaching pendant 400 is operated by an operator, and is used for issuing commands to the robot arm 200 and the robot controller 300.

The arm body 201 includes a plurality of links $210_0$ to $210_6$ joined by a plurality of joints $J_1$ to $J_6$. Although a case where the joints of the arm body 201 are rotary joints will be described, the joints may be linear joints. The joints $J_1$ to $J_6$ each serve as an example of a predetermined part.

The arm body 201 includes a driving mechanism $230_i$ that rotationally drives a joint $J_i$. In this case, i is 1, 2, 3, 4, 5, or 6. To be noted, in FIG. 1, i is 2. That is, FIG. 1 illustrates only a driving mechanism $230_2$ of the joint $J_2$, and illustration of the other driving mechanisms is omitted. The orientation of the robot arm 200 can be changed by the driving mechanism $230_i$ rotationally driving the joint $J_i$. By changing the orientation of the robot arm 200, the hand 202 serving as a distal end portion of the robot arm 200 can be moved to an arbitrary position and orientation.

The display apparatus 600 serving as an example of an apparatus that issues warning is a display such as a liquid crystal display or an organic electroluminescence display, and displays an image corresponding to image data serving as an example of predetermined data that has been input. The input device 700 is, for example, a keyboard 701 and a mouse 702. To be noted, the apparatus that issues warning is not limited to the display apparatus 600, and may be a loudspeaker, or a terminal capable of communicating with the processing apparatus main part 500.

Figure 2:
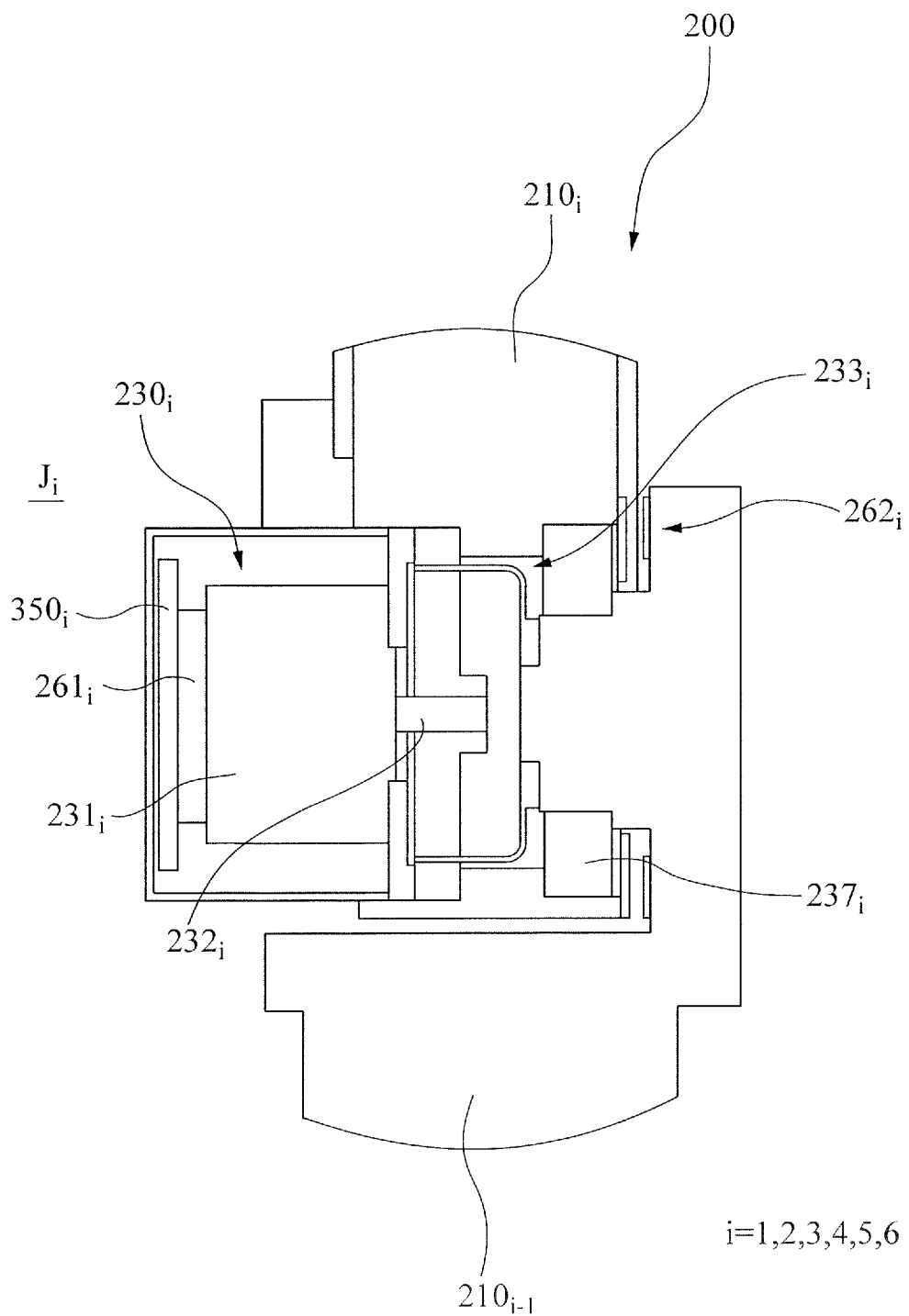
FIG. 2 is a schematic section view of a joint of the robot arm according to the exemplary embodiment.

The joints $J_1$ to $J_6$ differ in size and shape, but have approximately the same configuration. FIG. 2 is a schematic section view of a joint $J_i$ that is one of the joints $J_1$ to $J_6$ of the robot arm 200 according to the exemplary embodiment. As illustrated in FIG. 2, the joint $J_i$ of the robot arm 200 includes the driving mechanism $230_i$, an input shaft encoder $261_i$, an output shaft encoder $262_i$, and so forth.

The driving mechanism $230_i$ includes an electric motor $231_i$ serving as an example of a driving portion, and a reduction gear $233_i$ that reduces and outputs the rotation speed of a rotation shaft $232_i$ of the motor $231_i$. The rotation shaft $232_i$ extending from a rotor of the motor $231_i$ is fixed to the input shaft of the reduction gear $233_i$. The output shaft of the reduction gear $233_i$ is fixed to a link $210_i$. The link $210_i$ is relatively moved with respect to a link $210_{i-1}$ by the driving force of the motor $231_i$ transmitted through the reduction gear $233_i$.

The motor $231_i$ is, for example, a brushless direct current servo motor: brushless DC servo motor or an alternate current servo motor: AC servo motor, and is under servo control of a motor control unit $350_i$. To be noted, although a case where the motor control unit $350_i$ is disposed inside the robot arm 200 is illustrated in FIG. 2, the motor control unit $350_i$ may be disposed outside the robot arm 200. For example, the motor control unit $350_i$ may be disposed in a casing of the robot controller 300.

The reduction gear $233_i$ is, for example, a strain wave gearing, and reduces the rotation speed of the motor $231_i$ to move the joint $J_i$. As a result of this, the link $210_i$ relatively rotates about the joint $J_i$ with respect to the link $210_{i-1}$. The rotation angle of the output shaft of the reduction gear $233_i$ serves as the rotation angle of the joint $J_i$.

The input shaft encoder $261_i$ that is an encoder and the output shaft encoder $262_i$ that is an encoder are rotary encoders, may be optical encoders or magnetic encoders, and may be absolute encoders or incremental encoders.

The input shaft encoder $261_i$ is provided on the input side of the reduction gear $233_i$, and the output shaft encoder $262_i$ provided on the output side of the reduction gear $233_i$. The input shaft encoder $261_i$ outputs a signal corresponding to displacement of the joint $J_i$, specifically a signal corresponding to the rotation angle of the rotation shaft $232_i$ of the motor $231_i$. The output shaft encoder $262_i$ outputs a signal corresponding to displacement of the joint $J_i$ specifically a signal corresponding to the relative angle of the link $210_i$ with respect to the link $210_{i-1}$, that is, a signal corresponding to the rotation angle of the joint $J_i$.

To be noted, the links $210_{i-1}$ and $210_i$ are rotatably connected via a crossed roller bearing $237_i$.

Figure 3:
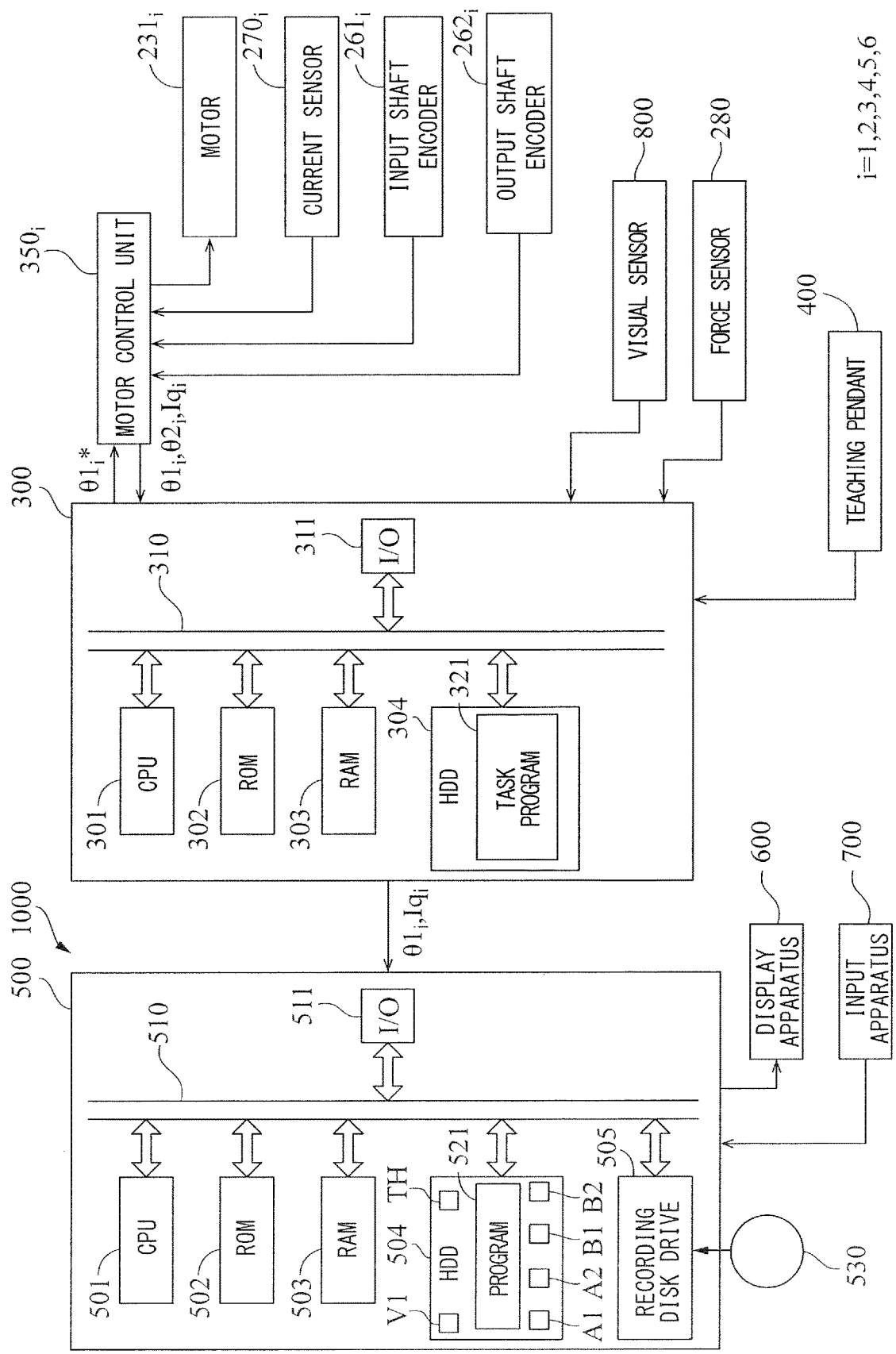
FIG. 3 is a block diagram illustrating a control system of the robot apparatus according to the exemplary embodiment.

FIG. 3 is a block diagram illustrating a control system of the robot apparatus 100 according to the exemplary embodiment. The robot controller 300 and the processing apparatus main part 500 are each constituted by a computer.

The processing apparatus main part 500 includes a central processing unit: CPU 501 serving as a processor that is an example of a processing portion. In addition, the processing apparatus main part 500 includes a read only memory: ROM 502, a random access memory: RAM 503, and a hard disk drive: HDD 504 serving as examples of a storage portion. In addition, the processing apparatus main part 500 includes a recording disk drive 505, and an I/O 511 that is an input/output interface.

The CPU 501, the ROM 502, the RAM 503, the HDD 504, the recording disk drive 505, and the I/O 511 are communicably interconnected via a bus 510. The I/O 511 is connected to the robot controller 300, the display apparatus 600, and the input device 700.

The robot controller 300 includes a CPU 301 serving as an example of a processor. In addition, the robot controller 300 includes a ROM 302, a RAM 303, and an HDD 304 serving as examples of a storage portion. In addition, the robot controller 300 includes an I/O 311 that is an input/output interface.

The CPU 301, the ROM 302, the RAM 303, the HDD 304, and the I/O 311 are communicably interconnected via a bus 310. The I/O 311 is connected to the processing apparatus main part 500, the motor control unit $350_i$, the teaching pendant 400, the visual sensor 800, and the force sensor 280.

FIG. 3 illustrates the motor control unit $350_i$ of one joint. However, in the present exemplary embodiment, since the six joints $J_1$ to $J_6$ are provided, six motor control units $350_1$ to $350_6$ are provided. The motor control unit $350_i$ is connected to a motor $231_i$, a current sensor $270_i$, an input shaft encoder $261_i$, and an output shaft encoder $262_i$ corresponding to the joint $J_i$. Although the motor $231_i$, the current sensor $270_i$, the input shaft encoder $261_i$, and the output shaft encoder $262_i$ of one joint are illustrated in FIG. 3, six joints are provided in the present exemplary embodiment. Therefore, motors $231_1$ to $231_6$, current sensors $270_1$ to $270_6$, input shaft encoders $261_1$ to $261_6$, and output shaft encoders $262_1$ to $262_6$ are provided in correspondence with the joints $J_1$ to $J_6$.

The CPU 301 controls, via the motor control unit $350_i$, the motor $231_i$ that drives the joint $J_i$ of the robot arm 200, and thus controls the operation of the robot arm 200. In addition, the CPU 301 receives a signal representing an instruction transmitted from the teaching pendant 400 by an operation of an operator.

The HDD 304 stores a task program 321. The task program 321 describes a command for causing the robot arm 200 to perform a reproductive operation or an adaptive operation. The reproductive operation is a first operation of causing the robot arm 200 to repetitively perform the same operation such as placing a part held by the robot arm 200 in a predetermined position and moving back to an original position, which is performed by the robot arm 200 under teaching/playback control. The adaptive operation is a second operation of causing the robot arm 200 to perform a different operation each time, which is performed under, for example, random picking control using the visual sensor 800 or force control using the force sensor 280. The second operation is an operation different from the first operation. In the present exemplary embodiment, a case where the robot arm 200 is caused to perform two kinds of operations including the first operation and the second operation will be described.

The CPU 301 reads the task program 321, and generates trajectory data of the joint $J_i$ of the robot arm 200. The trajectory data is a set of angle command values $\theta 1_i^*$ of the motor $231_i$ of the joint $J_i$, which are each commanded every predetermined time period. The CPU 301 outputs an angle command value $\theta 1_i^*$ for the motor $231_i$ of the joint $J_i$ to the motor control unit $350_i$ every predetermined time period. The motor control unit $350_i$ controls the motor $231_i$ such that an angle value $\theta 1_i$ detected by the input shaft encoder $261_i$ becomes closer to the angle command value $\theta 1_i^*$.

Figure 4:
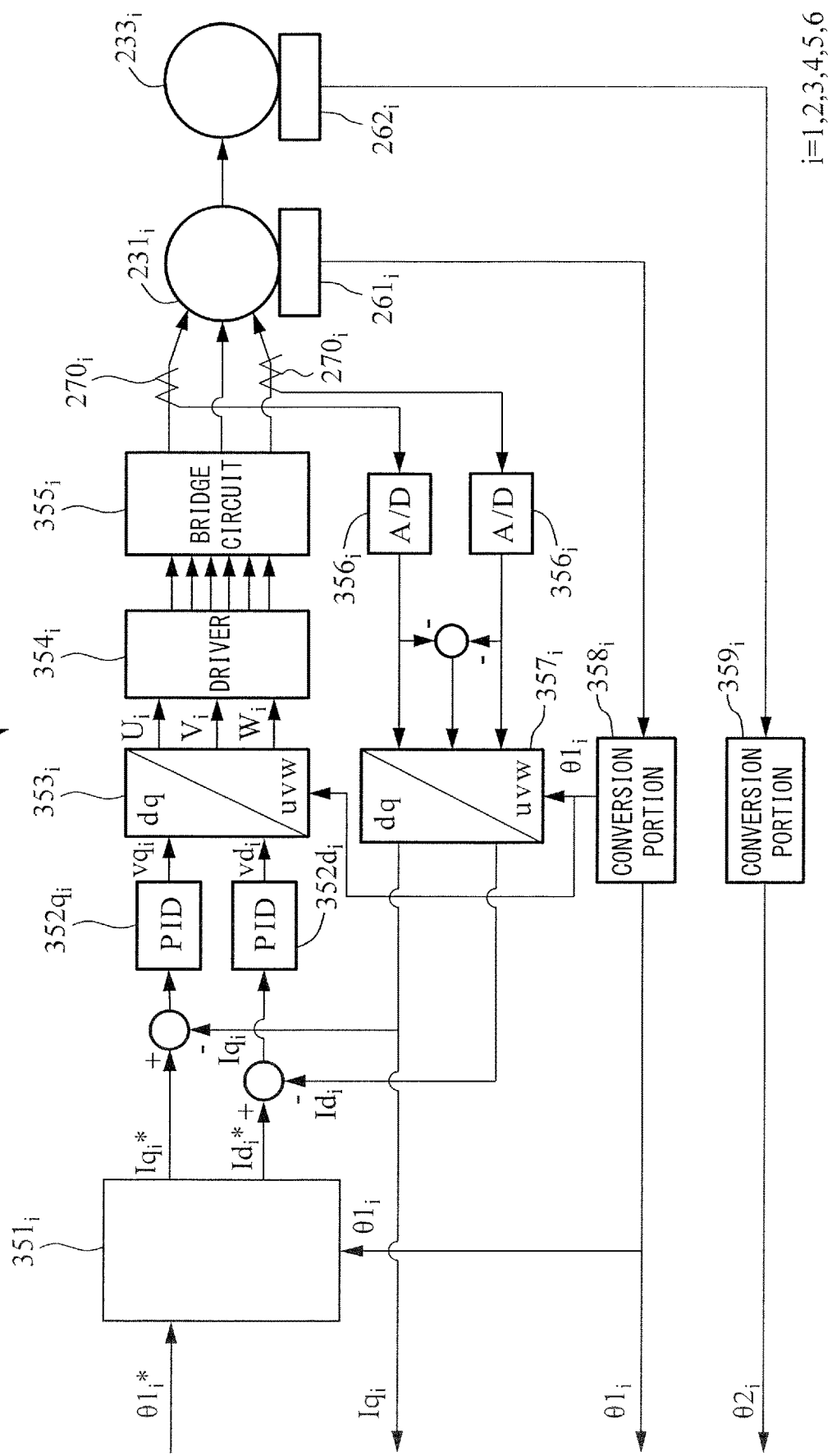
FIG. 4 is a block diagram of a motor control unit according to the exemplary embodiment.

FIG. 4 is a block diagram of the motor control unit $350_i$ of the exemplary embodiment. The feedback control performed by the motor control unit $350_i$ of the present exemplary embodiment is semi-closed loop control using the input shaft encoder $261_i$. To be noted, the feedback control performed by the motor control unit $350_i$ is not limited to the semi-closed loop control, and may be full-closed loop control using the output shaft encoder $262_i$. In addition, the motor control unit $350_i$ may selectively perform one kind of feedback control among the semi-closed loop control and the full-closed loop control.

The motor control unit $350_i$ includes a position control portion $351_i$, a proportional-integral-derivative calculation portions: PID calculation portions $352_{q_i}$ and $352d_i$, a voltage calculation portion $353_i$, a driver $354_i$, a bridge circuit $355_i$, an analog/digital conversion portion: A/D conversion portion $356_i$, a current calculation portion $357_i$, and conversion portions $358_i$ and $359_i$.

The current sensor $270_i$ outputs a signal indicating the amounts of current flowing in respective phases of the motor $231_i$ to the A/D conversion portion $356_i$. The A/D conversion portion $356_i$ quantizes the signal indicating the amounts of current, converts the signal into numerical data, and outputs the numerical data to the current calculation portion $357_i$ as current values of three phases.

The input shaft encoder $261_i$ outputs a pulse signal corresponding to the rotation angle of the rotor of the motor $231_i$, that is, the input shaft of the reduction gear $233_i$ to the conversion portion $358_i$. The conversion portion $358_i$ converts the pulse signal transmitted from the input shaft encoder $261_i$ into a sensor value, which is numerical data representing an angle, and feeds back the encoder value $\theta 1_1$, which is this sensor value, to the voltage calculation portion $353_i$, the current calculation portion $357_i$, and the position control portion $351_i$. Further, the conversion portion $358_i$ outputs a data signal indicating the encoder value $\theta 1_i$ of the input shaft encoder $261_i$ to an external device, which is the robot controller 300 in the present exemplary embodiment.

The current calculation portion $357_i$ obtains, on the basis of the three-phase current values that have been input and the encoder value $\theta 1_i$, a torque current value $Iq_i$, which is a q-axis current value, and an excitation current value $Id_i$, which is a d-axis current value. The current calculation portion $357_i$ feeds back the torque current value $Iq_i$ to the PID calculation portion $352q_i$, and feeds back the excitation current value $Id_i$ to the PID calculation portion $352d_i$. Further, the current calculation portion $357_i$ outputs a data signal indicating the torque current value $Iq_i$ to the external device, which is the robot controller 300 in the present exemplary embodiment.

The output shaft encoder $262_i$ outputs a pulse signal corresponding to the angle of the joint, that is, the rotation angle of the output shaft of the reduction gear $233_i$ to the conversion portion $359_i$. The conversion portion $359_i$ converts the pulse signal transmitted from the output shaft encoder $262_i$ into a sensor value, which is numerical data representing an angle, and feeds back the encoder value $\theta 2_1$, which is this sensor value, to the external device, which is the robot controller 300 in the present exemplary embodiment.

Meanwhile, the position control portion $351_i$ obtains a torque current command value $Iq_i^*$, which is a q-axis current command value, and an excitation current command value $Id_i^*$, which is a d-axis current command value, such that difference between the angle command value $\theta 1_i^*$ and the encoder value $\theta 1_i$ becomes smaller.

The PID calculation portion $352_i$ obtains a voltage value $vq_i$ by PID control based on the difference between the torque current command value $Iq_i^*$ and the torque current value $Iq_i$. The PID calculation portion $352d_i$ obtains a voltage value $vd_i$ by PID control based on the difference between the excitation current command value $Id_i^*$ and the excitation current value $Id_i$.

The voltage calculation portion $353_i$, converts the voltage values $vd_i$ and $vq_i$ into pulse width modulation signals: PWM signals $U_i$, $V_i$, and $W_i$ corresponding to voltages to be applied to respective phases of the motor $231_i$. The driver $354_i$ drives control ports of respective semiconductor switching elements of the bridge circuit $355_i$ in accordance with the PWM signals $U_i$, $V_i$, and $W_i$ by PWM driving. The control ports are each a gate or a base. According to this, the bridge circuit $355_i$ controls torque current and excitation current by on/off control of voltage to be output to the motor $231_i$.

The robot controller 300 receives data signals indicating the encoder values $\theta 1_i$ and $\theta 2_i$ and the torque current value $Iq_i$ corresponding to the joint $J_i$, and performs various calculation. In addition, in the present exemplary embodiment, the robot controller 300 outputs a data signal indicating the encoder value $\theta 1_i$ and a data signal indicating the torque current value $Iq_i$ corresponding to the joint $J_i$ sequentially at a predetermined period to the processing apparatus main part 500. To be noted, the motor control unit $350_i$ corresponding to the joint $J_i$ may sequentially output the data signal indicating the encoder value $\theta 1_i$ and the data signal indicating the torque current value $Iq_i$ directly to the processing apparatus main part 500 not through the robot controller 300.

In a series of operations that the robot controller 300 causes the robot arm 200 to perform during automatic operation of the robot apparatus 100 in a manufacture line such as an assembly operation of a product, the first operation and the second operation are both included. The robot controller 300 causes the robot arm 200 to perform an assembly operation of the product W0 by switching between the first operation and the second operation during an automatic operation following the task program 321. The robot controller 300 is not configured to output to the external device information indicating which of the first operation and the second operation the robot arm 200 is performing. In addition, prediction of whether or not malfunction of the robot arm 200 will occur is performed on the basis of the difference between a measured value and a reference value, and the reference value to be compared with the measured value should be changed between the first operation and the second operation.

Figure 5:
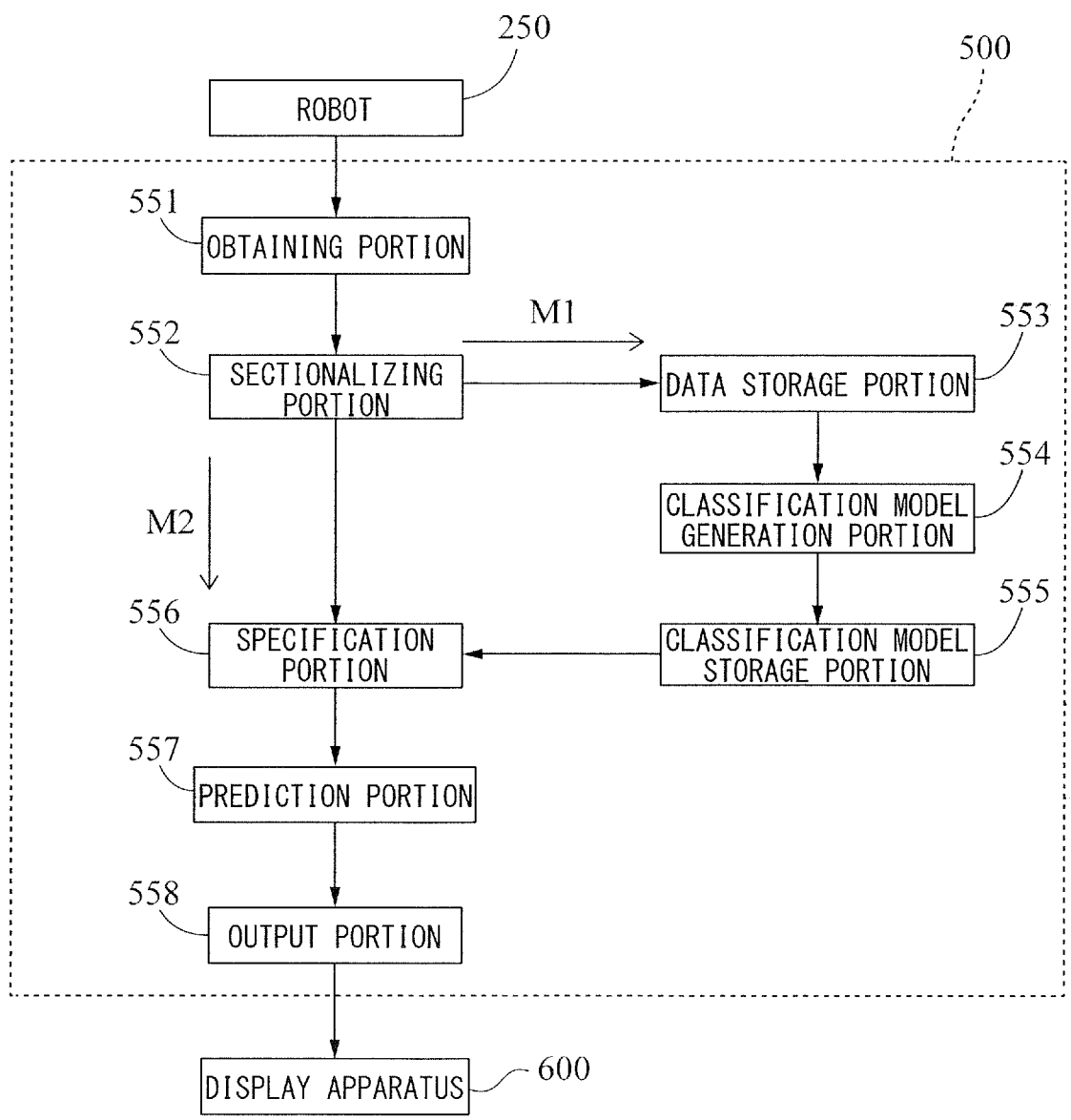
FIG. 5 is a function block diagram of a processing apparatus that performs a processing method according to the exemplary embodiment.

In the present exemplary embodiment, the processing apparatus main part 500 obtains time-series data of the encoder value $θ1_i$ and the torque current value $Iq_i$ output from the robot 250 at a predetermined period, performs statistical processing, and predicts malfunction of the robot arm 200. The HDD 504 serving as an example of a storage portion stores a program 521 for causing the CPU 501 serving as an example of a processing portion to perform a processing method that will be described later. FIG. 5 is a function block diagram of the processing apparatus main part 500 that performs the processing method according to the exemplary embodiment. As a result of the CPU 501 illustrated in FIG. 3 executing the program 521, the CPU 501 functions as an obtaining portion 551, a sectionalizing portion 552, a classification model generation portion 554, a specification portion 556, a prediction portion 557, and an output portion 558 illustrated in FIG. 5. The HDD 504 illustrated in FIG. 3 functions as a data storage portion 553 and a classification model storage portion 555.

To be noted, although a case where the HDD 504 is a computer-readable non-transitory recording medium and the HDD 504 stores the program 521 will be described in the present exemplary embodiment, the configuration is not limited to this. The program 521 may be recorded in any recording medium as long as the recording medium is computer-readable and non-transitory. For example, as the recording medium for supplying the program 521, the ROM 502 illustrated in FIG. 3, a recording disk 530, or an unillustrated external storage device may be used. Specific examples of the recording medium include a flexible disk, a hard disk, an optical disk, a magneto-photo disk, a magnetic tape, and a nonvolatile memory. Examples of the optical disk include a DVD-ROM, a CD-ROM, and a CD-R. Examples of the nonvolatile memory include a USB memory, a memory card, and a ROM.

The CPU 501 illustrated in FIG. 3 is capable of selectively executing a learning mode M1 serving as a first mode and a monitoring mode M2 serving as a second mode, and the modes can be selected by a user. A case where the learning mode M1 has been selected will be described. The CPU 501 sets an index to be used for specifying whether the operation of the robot arm 200 is a first operation of a second operation, and also sets a first reference value A1 to be used in the first operation. A second reference value A2 to be used in the second operation is set before executing the monitoring mode M2. The learning mode M1 is performed by, for example, actually causing the robot arm 200 to perform automatic operation in an initial stage such as at the time of installation of the robot arm 200 in the manufacture line.

A case where the monitoring mode M2 has been selected will be described. The CPU 501 specifies which of the first operation and the second operation is being performed in the automatic operation of the robot arm 200 by using the index set in the learning mode M1, and predicts malfunction of the robot arm 200 by using a reference value corresponding to the operation. To be noted, although a case where the user selects the mode has been described, the configuration is not limited to this. The CPU 501 may automatically select the mode in accordance with a period that has been designated in advance.

First, details of the case where the CPU 501 functions in the learning mode M1 will be described. In the case where the CPU 501 functions in the learning mode M1, the CPU 501 functions as the obtaining portion 551, the sectionalizing portion 552, and the classification model generation portion 554 in FIG. 5.

The obtaining portion 551 obtains respective data from the robot 250 in time series. Specifically, the obtaining portion 551 obtains the encoder value $θ1_i$, which is a sensor value based on the signal output from the input shaft encoder $261_i$ serving as a first sensor, in time series from the robot controller 300. The obtaining portion 551 obtains the torque current value $Iq_i$, which is a sensor value based on the signal output from the current sensor $270_i$ serving as a second sensor, in time series from the robot controller 300 of the robot 250. Respective time-series data, that is, the encoder value $θ1_i$ and the torque current value $Iq_i$ are associated with time when these values are obtained in the motor control unit $350_i$. Therefore, these pieces of time-series data are synchronized. To be noted, the time-series data of the encoder value $θ1_i$ obtained by the CPU 501 serving as the obtaining portion 551 is temporarily stored in the RAM 503.

Figure 6A:
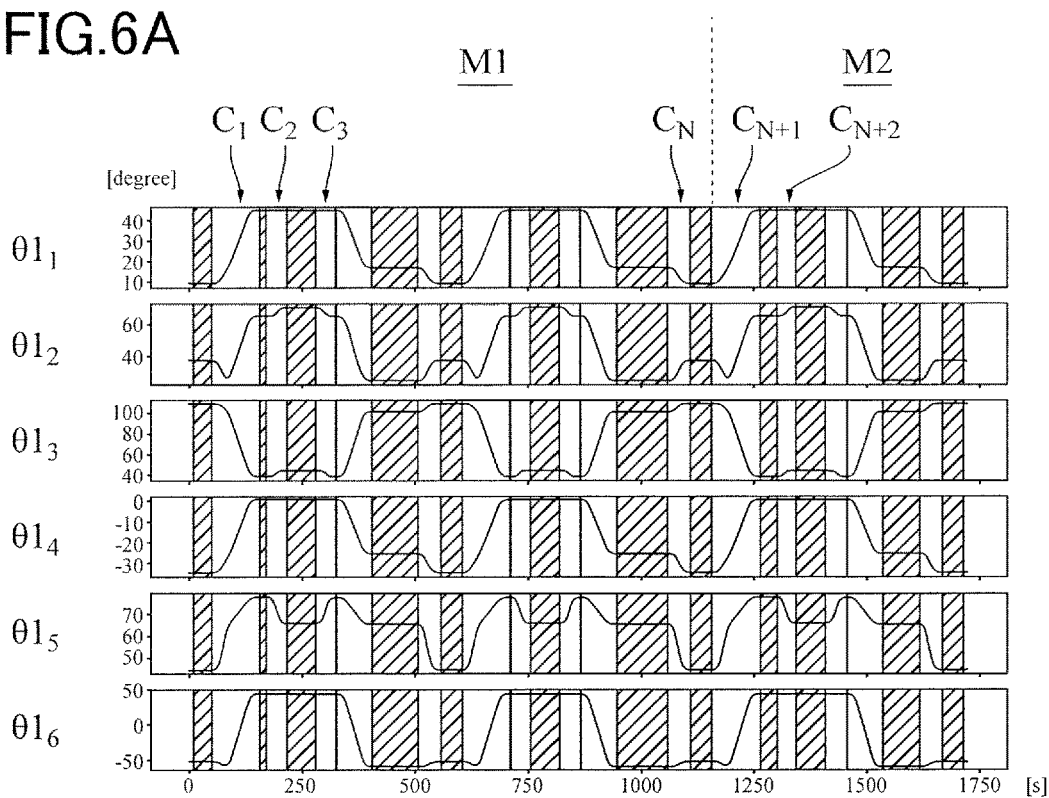
FIG. 6A is a diagram illustrating an example of encoder values according to the exemplary embodiment.
Figure 6B:
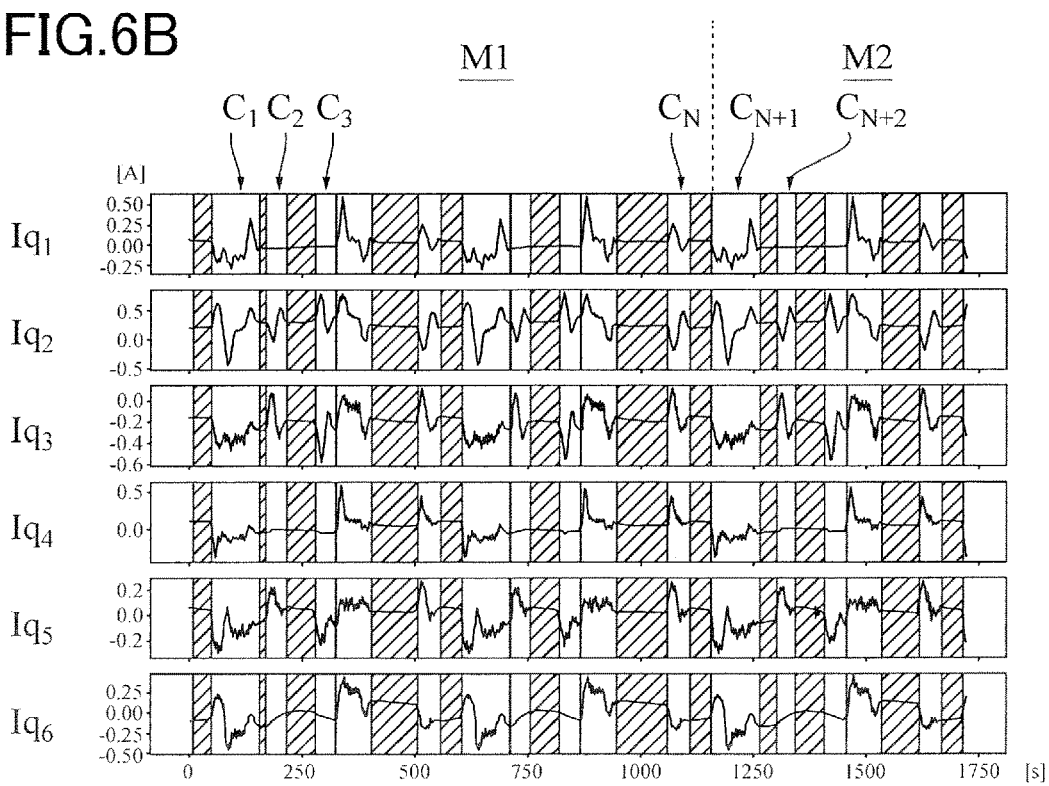
FIG. 6B is a diagram illustrating an example of torque current values according to the exemplary embodiment.

FIG. 6A is a diagram illustrating an example of encoder values $θ1_1$ to $θ1_6$ in the exemplary embodiment. FIG. 6B is a diagram illustrating an example of the torque current values $Iq_1$ to $Iq_6$ in the exemplary embodiment. The sectionalizing portion 552 illustrated in FIG. 5 sectionalizes each of the encoder values $θ1_i$ to $θ1_6$ obtained in time series for each unit operation. In the examples of FIGS. 6A and 6B, the sectionalizing portion 552 sectionalizes each of the encoder values $θ1_1$ to $θ1_6$ obtained in time series into a plurality of sections $C_1, C_2, C_3, \ldots, C_N$. That is, the sectionalizing portion 552 sectionalizes the multi-dimensional time-series data that has been input into unit operations on the basis of the time-series data of the encoder values $θ1_1$ to $θ1_6$ of the respective joints $J_1$ to $J_6$ representing the change in orientation of the robot arm 200. Each unit operation indicates a small section constituting a series of operations of the robot arm 200. The series of operations of the robot arm 200 are constituted by combinations of the unit operations. A case where the robot arm 200 picks up a part placed on a tray will be described as an example. Unit operations of the robot arm 200 are, for example, "moving from an original position to above the tray", "moving to the vicinity of a picking target part and capturing an image", "holding the picking target part while adjusting the position of the hand", "moving to a placing stage and releasing the hold", and "moving back to the original position". However, information of these unit operations is not output from the robot controller 300. Therefore, the CPU 501 judges the unit operations of the robot arm 200 on the basis of the encoder value $θ1_i$.

In the present exemplary embodiment, the sectionalizing portion 552 performs the sectionalization at portions where a value of displacement velocity of one of the joints $J_1$ to $J_6$ of the robot arm 200, preferably values of displacement velocities of all the joints $J_1$ to $J_6$ are lower than a velocity threshold value V1 serving as a predetermined first threshold value. In the examples of FIGS. 6A and 6B, the time-series data of the encoder values $θ1_1$ to $θ1_6$ is sectionalized at shaded portions. The displacement velocity of the joint $J_i$ is angular velocity in the present exemplary embodiment. The sectionalizing portion 552 calculates the displacement velocity of the joint $J_i$ by obtaining the amount of change of the encoder value $θ1_i$ per unit time. That is, the sectionalizing portion 552 calculates the displacement velocity of the joint $J_i$ by performing first-order differentiation of the encoder value $θ1_i$ by time. The velocity threshold value V1 is a value at which the robot 250 can be regarded as stopped, that is, at which the displacement velocity of the joint can be regarded as 0, and the information thereof is stored in the HDD 504 illustrated in FIG. 3. The shaded portions in FIGS. 6A and 6B are sections where the temporal change of the encoder values $θ1_1$ to $θ1_6$ of all the joints $J_1$ to $J_6$ can be regarded as 0, that is, periods when the operation of the robot arm 200 is stopped. The remaining sections $C_1$, $C_2$, $C_3$, . . . , $C_N$ excluding the periods when the operation of the robot arm 200 is stopped correspond to the unit operations. A section $C_i$ is a section where the value obtained by differentiation of the encoder value $θ1_i$ extracted from the time-series data of the encoder value $θ1_i$, that is, the value of the displacement velocity is larger than the velocity threshold value V1. As described above, it is preferable that the series of operations of the robot arm 200 are sectionalized into unit operations at portions where, for example, the robot arm 200 is stopped. This is because there are many cases where the robot arm 200 is stopped due to, for example, interlocking with external devices, at transitional portions between the unit operations. By sectionalizing the time-series data of the encoder value $θ1_i$ by using stoppage of the robot arm 200 as a predetermined condition, time-series data of sections each corresponding to a unit operation can be easily obtained. Although the sectionalizing portion 552 may perform the sectionalization processing after accumulating some amount of time-series data, the sectionalizing portion 552 may perform the sectionalization processing each time the data of the encoder value $θ1_i$ and the torque current value $Iq_1$ is obtained.

The time-series data sectionalized into the sections $C_1$, $C_2$, $C_3$, . . . , $C_N$ is stored in the data storage portion 553. The data storage portion 553 stores the time-series data sectionalized into unit operations by the sectionalizing portion 552 in such a manner that past time-series data that is stored can be referred to by the classification model generation portion 554.

The classification model generation portion 554 clusters, on the basis of the change in the orientation of the robot arm 200, the past time-series data of unit operations stored in the data storage portion 553, and thus generates a classification model. As a method for the clustering, existing methods such as the k-means method can be used. In the present exemplary embodiment, the number of kinds of operations of the robot arm 200, that is, the number of clusters is unknown. Therefore, the method for the clustering is preferably combined with a method for estimating the number of clusters such as the elbow method or the X-means method.

An example of the clustering performed by the classification model generation portion 554 will be described below in detail. FIG. 6A illustrates the time-series data of the encoder values $θ1_1$ to $θ1_6$ sectionalized into sections $C_1$, $C_2$, $C_3$, . . . , $C_N$. The classification model generation portion 554 compresses the multi-dimensional time-series data of each section into point data, for example, two-dimensional point data by a method such as principal component analysis: PCA. The point data obtained in this manner is present in the number corresponding to the sections $C_1$, $C_2$, $C_3$, . . . , $C_N$, that is, N. Each piece of point data indicates time-series data of the encoder values $θ1_1$ to $θ1_6$ of one section.

Figure 7:
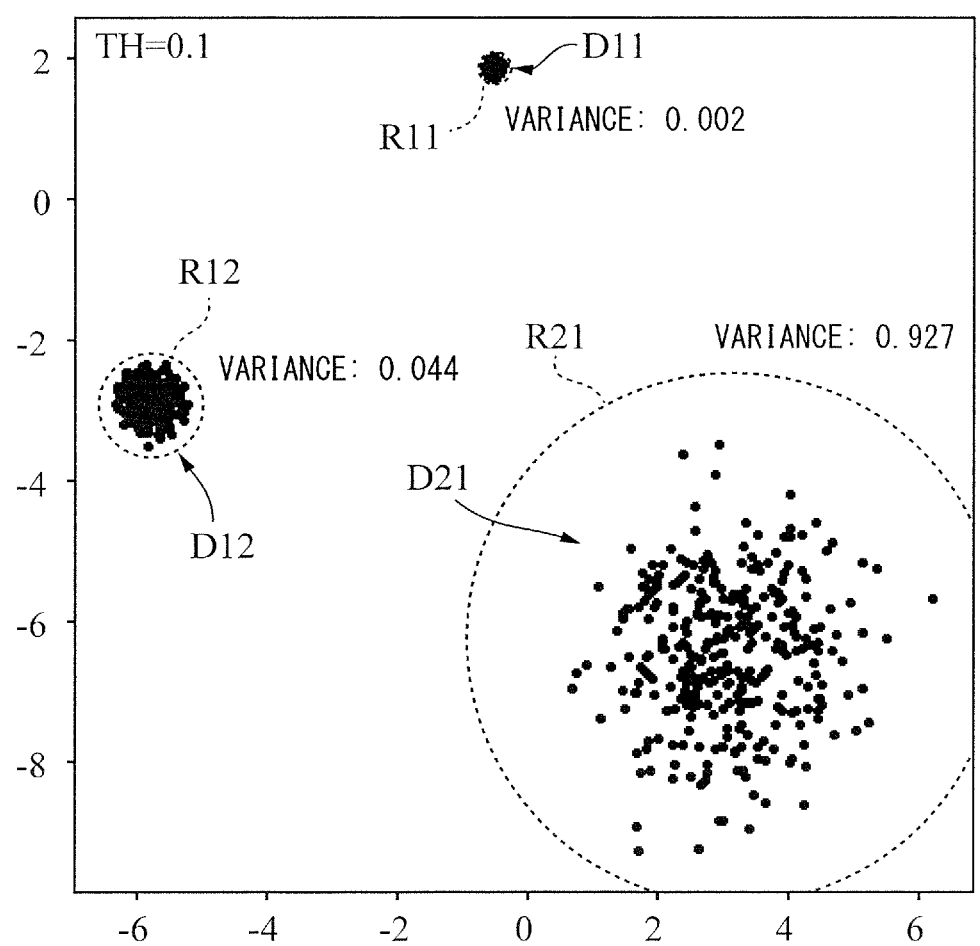
FIG. 7 is a diagram illustrating an example of clusters according to the exemplary embodiment.

FIG. 7 is a diagram illustrating an example of clusters in the exemplary embodiment. The classification model generation portion 554 clusters the encoder values $θ1_1$ to $θ1_6$ sectionalized into the sections $C_1$ to $C_N$, that is, a plurality of pieces of point data. The classification model generation portion 554 clusters the plurality of pieces of point data into first clusters D11 and D12 whose variance is equal to or smaller than a threshold value TH serving as a second threshold value and a second cluster D21 whose variance is larger than the threshold value TH by the clustering. Information of the threshold value TH is stored in advance in the HDD 504 illustrated in FIG. 3. Since the sectionalized time-series data of the encoder values $θ1_1$ to $θ1_6$ is converted into the point data, the time-series data of one section is represented by one dot in the two-dimensional plane of FIG. 7. The threshold value TH is set to, for example, 0.1. FIG. 7 illustrates the first cluster D11 constituted by a plurality of pieces of point data whose variance is 0.002, which is smaller than the threshold value TH, and the first cluster D12 constituted by a plurality of pieces of point data whose variance is 0.044, which is smaller than the threshold value TH. In addition, FIG. 7 illustrates the second cluster D21 constituted by a plurality of pieces of point data whose variance is 0.927, which is larger than the threshold value TH.

Unit operations corresponding to the pieces of point data belonging to the first clusters D11 and D12 are first operations, and unit operations corresponding to the pieces of point data belonging to the second cluster D21 are second operations. That is, in the first operation, since the robot arm 200 repeats the same operation, the variance of the point data is relatively small. In the second operation, since the robot arm 200 performs a different operation each time, the variance of the point data is relatively large. Therefore, the first clusters D11 and D12 corresponding to the first operations and the second cluster D21 corresponding to the second operation can be determined by whether the variance of the point data surpasses the threshold value TH or not.

The classification model generation portion 554 stores a classification model for classifying the point data into the clusters D11, D12, and D21 in the classification model storage portion 555 after finishing classifying the time-series data of the encoder value $θ1_i$ of the sections $C_1$ to $C_N$ into the clusters D11, D12, and D21. The classification model storage portion 555 stores the classification model generated by the classification model generation portion 554 in such a manner that the classification model can be referred to by the specification portion 556. In this manner, the classification model serving as an index for determining whether the operation is the first operation or the second operation to be used in the monitoring mode M2 to be performed later is set. In FIG. 7, a classification model corresponding to the first cluster D11 is schematically indicated by a region R11, a classification model corresponding to the first cluster D12 is schematically indicated by a region R12, and a classification model corresponding to the second cluster D21 is schematically indicated by a region R21.

Next, the first reference value A1 illustrated in FIG. 3 that will be used when the operation of the robot arm 200 is specified as the first operation in the monitoring mode M2 to be performed later will be described. In the present exemplary embodiment, in the learning mode M1, the CPU 501 obtains the first reference value A1 from the torque current value $Iq_i$ that is a measured value of the current sensor $270_i$ of the robot arm 200 in a normal state in which no malfunction is occurring. That is, malfunction of the robot arm 200 is often an abnormality such as malfunction of the motor $231_i$ or the reduction gear $233_i$. The abnormality of the motor $231_i$ or the reduction gear $233_i$ is often reflected on the torque current value $Iq_i$ serving as an example of a current value of the current sensor $270_i$. That is, there is a tendency that, when the motor $231_i$ or the reduction gear $233_i$ deteriorates, the torque current value $Iq_i$ for driving the joint $J_i$ increases. Therefore, in the present exemplary embodiment, the torque current value $Iq_i$ is set as a monitoring target. In addition, although the CPU 501 may individually monitor each of the joints of the robot arm 200 in the monitoring mode M2, the CPU 501 collectively monitors the entirety of the robot arm 200 in the present exemplary embodiment.

In the learning mode M1, the CPU 501 obtains in time series the torque current value $Iq_i$ together with the encoder value $\theta 1_i$ from the robot 250 and sectionalizes the torque current value $Iq_i$ in association with the encoder value $\theta 1_i$. That is, the CPU 501 sectionalizes the torque current value $Iq_i$ into the sections $C_1, C_2, C_3, \ldots, C_N$ similarly to the encoder values $\theta 1_i$ as illustrated in FIG. 6B. The CPU 501 extracts the time-series data of the torque current value $Iq_i$ of the same section as the encoder value $\theta 1_i$ belonging to the first cluster D11 illustrated in FIG. 7 from the sections $C_1, C_2, C_3, \ldots, C_N$. That is, the CPU 501 extracts the time-series data of the torque current value $Iq_i$ of a section corresponding to the first operation. Then, the CPU 501 obtains the first reference value A1 by using the extracted data. For example, the CPU 501 compresses the time-series data of the torque current value $Iq_i$ of each section corresponding to the first cluster D11 into point data by a predetermined method. The predetermined method may be any method such as PCA described above. An example of another method will be described below. The CPU 501 obtains the absolute value of each torque current value included in time-series data of one joint of one section corresponding to the first cluster D11, and obtains the average value of the absolute values of the section. The CPU 501 performs this calculation of obtaining the average value for each of the six joints, and thus obtains six-dimensional point data having six average values as parameters. The CPU 501 obtains point data indicating the torque current value $Iq_i$ for sections corresponding to the first cluster D11 among the sections $C_1, C_2, C_3, \ldots, C_N$ by the predetermined method described above. The CPU 501 obtains the first reference value A1 on the basis of the plurality of pieces of point data obtained in correspondence with the first cluster D11. For example, the CPU 501 sets a representative value, a median, or an average value of the plurality of pieces of obtained point data as the first reference value A1. The obtained first reference value A1 is stored in the HDD 504 serving as a storage portion. The first reference value A1 is also set for the first cluster D12 in a similar manner. That is, in the case where there are a plurality of first clusters, it is preferable that the first reference value A1 is individually set for each of the plurality of first clusters.

Next, the second reference value A2 illustrated in FIG. 3 that will be used when the operation of the robot arm 200 is specified as the second operation in the monitoring mode M2 will be described. A design value such as a standard value or a simulation value is used as the second reference value A2. Therefore, the timing of setting the second reference value A2 is not limited to during the learning mode M1, and may be any timing as long as the timing is before the monitoring mode M2 is executed. The second reference value A2 is stored in the HDD 504 serving as a storage portion.

Next, a case where the CPU 501 functions in the monitoring mode M2 will be described. In the case where the mode is switched by the user and the CPU 501 functions in the monitoring mode M2, the CPU 501 functions as the obtaining portion 551, the sectionalizing portion 552, the specification portion 556, the prediction portion 557, and the output portion 558 in FIG. 5.

The obtaining portion 551 obtains in time series the encoder value $\theta 1_i$ and the torque current value $Iq_i$ from the robot controller 300 during automatic operation of the robot arm 200. To be noted, the time-series data of each of the encoder value $\theta 1_i$, and the torque current value $Iq_i$, obtained by the obtaining portion 551 is temporarily stored in the RAM 503.

Then, when obtaining the encoder value $\theta 1_i$ and the torque current value $Iq_i$ of a unit operation of one section determined by sectionalization as a predetermined section, the sectionalizing portion 552 outputs data of the unit operation to the specification portion 556. In the example of FIGS. 6A and 6B, data of a section $C_{N+1}$ serving as an example of the predetermined section is output to the specification portion 556.

The specification portion 556 specifies, on the basis of the classification model stored in the classification model storage portion 555, which of the clusters D11, D12, and D21 the data of the section $C_{N+1}$ that has been input belongs to. For example, the specification portion 556 specifies which of the regions R11, R12, and R21 illustrated in FIG. 7 point data indicating the encoder value $\theta 1_i$ of the section $C_{N+1}$ belongs to. The clusters D11, D12, and D21, that is, the regions R11, R12, and R21 each correspond to one of the cases where the operation of the robot arm 200 is the first operation and where the operation of the robot arm 200 is the second operation.

The specification portion 556 outputs the result of specification to the prediction portion 557 together with the time-series data of the torque current value $Iq_i$ of the section $C_{N+1}$. The clusters D11, D12, and D21 each correspond to one of the first operation and the second operation. Therefore, the specification portion 556 specifies which of the first operation and the second operation the time-series data of the section $C_{N+1}$ that is input corresponds to at the same time with the specification of the cluster.

The prediction portion 557 selects an appropriate algorithm in accordance with the time-series data of the section $C_{N+1}$ that is input and the classification of the cluster thereof, calculates the degree of abnormality by, for example, the T2 method of Hotelling, and outputs the result of whether or not malfunction is predicted to the output portion 558. That is, the prediction portion 557 compares the torque current value $Iq_i$, which is a measured value, with the first reference value A1 to predict whether or not malfunction of the robot arm 200 will occur, in the case where the cluster is specified as corresponding to the first operation. The prediction portion 557 compares the torque current value $Iq_i$, which is a measured value, with the second reference value A2 to predict whether or not malfunction of the robot arm 200 will occur, in the case where the cluster is specified as corresponding to the second operation.

Specific examples will be described below. The prediction portion 557 obtains six-dimensional point data from the time-series data of the torque current value $Iq_i$ of the section $C_{N+1}$ by a method similar to the predetermined method described above. In the case where the point data representing the time-series data of the encoder value $\theta 1_i$ of the section $C_{N+1}$ is specified as belonging to the first cluster D11 or D12, the prediction portion 557 obtains the difference between the first reference value A1 and the point data representing the time-series data of the torque current value $Iq_i$ of the section $C_N$-$p_i$. This difference is a statistical distance. In the case where the obtained deviation is larger than a first predetermined value B1, the prediction portion 557 transmits a command for notifying abnormality to the output portion 558. To be noted, in the case where the obtained deviation is equal to or smaller than the first predetermined value B1, the prediction portion 557 finishes processing.

In addition, in the case where the point data of the encoder value $\theta1_i$ of the section $C_{N+1}$ is specified as belonging to the second cluster D21, the prediction portion 557 obtains the difference between the second reference value A2 and the point data representing the torque current value $Iq_i$ of the section $C_{N+1}$. This difference is a statistical distance. In the case where the obtained difference is larger than a second predetermined value B2, the prediction portion 557 transmits a command for notifying abnormality to the output portion 558. To be noted, in the case where the obtained difference is equal to or smaller than the second predetermined value B2, the prediction portion 557 finishes processing.

The first predetermined value B1 and the second predetermined value B2 are values stored in the HDD 504 in advance, and values set before malfunction of the robot arm 200 occurs. When the difference surpasses the predetermined value B1 or B2, malfunction of the robot arm 200 is predicted in the CPU 501.

In the case where malfunction is predicted in the prediction portion 557, that is, in the case of receiving the command notifying abnormality from the prediction portion 557, the output portion 558 outputs predetermined data, which is image data in the present exemplary embodiment, to the display apparatus 600. The display apparatus 600 displays an image based on the obtained image data. As a result of this, warning indicating that the robot arm 200 is likely to malfunction is notified to a user. To be noted, the malfunction of the robot arm 200 is yet to occur at the time when such warning is notified. In the case of receiving such notification, the user may carry out maintenance such as repairing of the robot arm 200 in the next planned regular checkup.

The section $C_{N+1}$ has been described above. The CPU 501 performs the processing of the monitoring mode M2 on a section $C_{N+2}$ and subsequent sections. In addition, the timing of the processing of the learning mode M1 is not limited to the initial stage after booting up the apparatus, and may be an arbitrary timing such as after performing the regular checkup or after changing the task program 321.

In the present exemplary embodiment, the CPU 501 obtains in time series the encoder value $\theta1_i$ of the input shaft encoder $261_i$ output in correspondence with the operation of the robot arm 200. Then, the CPU 501 sectionalizes the time-series data of the encoder value $\theta1_i$ into the sections $C_1$ to $C_N$ on the basis of a predetermined condition, and clusters the time-series data of the encoder value $\theta1_i$ sectionalized into the sections $C_1$ to $C_N$. As a result of this, the time-series data of the encoder value $\theta1_i$ of the sections $C_1$ to $C_N$ is classified into the clusters D11, D12, and D21 in correspondence with the kind of operation of the robot arm 200. Therefore, the CPU 501 is capable of predicting malfunction of the robot arm 200 by using a reference value suitable for the operation without receiving information about the kind of operation indicating which of the first operation and the second operation the robot 250 performs. As a result of this, the CPU 501 can perform processing suitable for the operation of the robot arm 200.

In addition, the CPU 501 sectionalizes the time-series data into the sections $C_1$ to $C_N$ by extracting, from the time-series data of the encoder values $\theta1_i$, sections where the value obtained by differentiation of the encoder value $\theta1_i$, that is, the value of the displacement velocity of the joint $J_i$ is larger than the velocity threshold value V1 as the predetermined condition. As a result of this, the CPU 501 can sectionalize the time-series data of the encoder value $\theta1_i$ for each unit operation of the robot arm 200, and thus perform processing suitable for the operation of the robot arm 200.

In addition, in the present exemplary embodiment, the CPU 501 outputs image data to the display apparatus 600 as a result of predicting that malfunction of the robot arm 200 will occur. As a result of this, warning is notified to a user at an appropriate time, thus maintenance operation that is not planned, that is, maintenance operation performed by stopping the robot 250 at a time other than regular checkup is reduced, and the productivity of the product W0 is improved.

To be noted, the present invention is not limited to the exemplary embodiment described above, and can be modified in various ways within the technical concept of the present invention. In addition, the effects described in the exemplary embodiment are just enumeration of the most preferable effects that can be achieved by the present invention, and the effects of the present invention are not limited to those described in the exemplary embodiment.

Although a case where the robot arm 200 is a vertically articulated robot arm has been described in the exemplary embodiment described above, the configuration is not limited to this. For example, the robot arm may be various robot arms such as a selective compliance assembly robot arm, a parallel link robot arm, and an orthogonal robot.

Although a case where the device that issues warning is the display apparatus 600 has been described in the exemplary embodiment described above, the configuration is not limited to this. In the case where the predetermined data output from the CPU 501 is sound data, the device that issues warning may be, for example, a loudspeaker. In addition, in the case where the predetermined data output from the CPU 501 is text data used for electronic mails or the like, the device that issues warning may be a terminal capable of communicating with the processing apparatus main part 500.

Although a case where the first sensor is the input shaft encoder $261_i$ has been described in the exemplary embodiment described above, the configuration is not limited to this. For example, the first sensor may be the output shaft encoder $262_i$.

In addition, although a case where the second sensor is the current sensor $270_i$ has been described in the exemplary embodiment described above, the configuration is not limited to this. For example, the second sensor may be the output shaft encoder $262_i$, or an unillustrated temperature sensor provided in the motor $231_i$ or in the vicinity of the motor $231_i$. In addition, the time-series information representing the sensor value of the second sensor may be, for example, digital I/O information communicated between the robot 250 and an unillustrated external device.

In addition, although a case where the first sensor and the second sensor are different has been described in the exemplary embodiment described above, the configuration is not limited to this. That is, the first sensor and the second sensor may be the same sensor. For example, the output shaft encoder $262_i$ may be used as this same sensor. That is, in the learning mode M1, the classification model and the first reference value A1 may be obtained from the encoder value $\theta2_i$ of the output shaft encoder $262_i$. In the monitoring mode M2, the encoder value $\theta2_i$ of one section may be used as the data used for determining whether the operation is the first operation and the data compared with the first reference value A1 or the second reference value A2.

In addition, although a case where the motor control unit $350_i$ obtains the torque current value $Iq_i$ from current values of three phases based on the signal of the current sensor $270_i$ has been described in the exemplary embodiment described above, the CPU 501 may obtain the torque current value $Iq_i$ from the current values of three phases.

In addition, although a case where the CPU 501 collectively monitors the entirety of the robot arm 200 has been described in the exemplary embodiment described above, the configuration is not limited to this. The CPU 501 may individually monitor each of the plurality of joints $J_1$ to $J_6$ of the robot arm 200. In this case, the reference values A1 and A2 are individually set for each of the joints $J_1$ to $J_6$.

In addition, in the exemplary embodiment described above, a case where the time-series data of the encoder value is sectionalized by performing first-order differentiation of the encoder value by time and excluding sections where the temporal change of the encoder value can be regarded as 0 from the time-series data of the encoder value has been described. However, in the case where the number of operations of the robot arm 200 is small, information indicating the first operation or information indicating the second operation may be associated with the operation of the robot arm 200 at the time of teaching the operation of the robot arm 200.

For example, information indicating the first operation is associated with an operation of "moving to above the tray from the original position" at the time of teaching, and information indicating the second operation is associated with an operation of "holding while adjusting the position of the hand" at the time of teaching. As a result of this, the encoder value obtained from the robot arm 200 when the robot arm 200 performs each operation can be sectionalized on the basis of the information indicating the first operation or the information indicating the second operation. Therefore, the processing of differentiating the encoder value can be omitted, and thus processing load on the CPU 501 can be reduced by the amount required for this processing.

In addition, the time-series data of the torque current value obtained when performing each operation may be directly sectionalized on the basis of the information indicating the first operation or the information indicating the second operation associated with each operation. As a result of this, processing of the encoder value can be further omitted, and thus the processing load on the CPU 501 can be further reduced by the amount required for this processing.

In addition, information indicating the kind of the operation may be associated with each operation at the time of teaching, and the encoder value and the torque current value obtained when performing each operation may be sectionalized on the basis of the information indicating the type of the operation.

In addition, although a case where the predetermined apparatus is the robot arm 200 has been described as an example in the exemplary embodiment described above, the configuration is not limited to this. For example, the predetermined apparatus may be various manufacturing apparatuses such as a linear apparatus that conveys a workpiece, a probe apparatus that detects the surface roughness, and a vapor deposition apparatus that performs vapor deposition of a film on a lens. In this case, a sensor such as an encoder or a current sensor may be provided on a driving portion that drives a predetermined part, and the CPU 501 can perform a processing method similar to that of the exemplary embodiment described above by inputting a program similar to that of the exemplary embodiment described above to the CPU 501.

In addition, the predetermined apparatus is not limited to a manufacturing apparatus, and may be an apparatus other than a manufacturing apparatus. For example, the predetermined apparatus may be a nursing robot, a robot for consumers, an office appliance, or an optical apparatus. Any apparatus that achieves an object of a user by moving a predetermined part can be used as the predetermined apparatus. Also in this case, a sensor such as an encoder or a current sensor may be provided on a driving portion of the predetermined part that moves, and the CPU 501 can perform a processing method similar to that of the exemplary embodiment described above by inputting a program similar to that of the exemplary embodiment described above to the CPU 501.

In addition, the configuration of the driving portion that drives each joint of the robot arm 200 is not limited to the configuration of the exemplary embodiment described above. For example, the driving portion that drives each joint may be a device or the like such as artificial muscle. In this case, a sensor capable of detecting the displacement of the device may be appropriately provided instead of the encoder or the current sensor.

In addition, it is preferable that the predetermined apparatus is a machine capable of automatically performing operations such as extension/contraction, bending, vertical movement, horizontal movement, pivoting, and combination of these on the basis of information stored in a storage device provided in a control apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-138894, filed Jul. 24, 2018, and Japanese Patent Application No. 2019-109202, filed Jun. 12, 2019, which are hereby incorporated by reference herein in their entirety.

What is claimed is:

1. A processing apparatus comprising:
a processing portion,
wherein the processing portion:
obtains a first sensor value of a first sensor output from a predetermined apparatus comprising the first sensor in correspondence with an operation of the predetermined apparatus;
obtains a change of the first sensor value on a basis of the first sensor value;
sectionalizes the first sensor value on a basis of the change of the first sensor value; and
sectionalizes the first sensor value into a first operation that causes the predetermined apparatus to repeatedly reproduce the operation, and a second operation that does not cause the predetermined apparatus to repeatedly reproduce the operation, on a basis of a degree of change in displacement of the predetermined apparatus.

2. The processing apparatus according to claim 1, wherein the processing portion sectionalizes the first sensor value by obtaining a degree of change by differentiating the first sensor value and extracting, from the first sensor value, a section where the degree of change deviates from a first threshold value.

3. The processing apparatus according to claim 2, wherein the processing portion determines that a section where the degree of change is within the first threshold is a section where the predetermined apparatus is stopped.

4. The processing apparatus according to claim 1, wherein the processing portion classifies the sectionalized first sensor value into a first group or a second group.

5. The processing apparatus according to claim 4, wherein the processing portion classifies the sectionalized first sensor value into the first group whose variance is equal to or smaller than a second threshold value or the second group whose variance is larger than the second threshold value.

6. The processing apparatus according to claim 5, wherein the processing portion further obtains the first sensor value of a predetermined section from the predetermined apparatus, and specifies which of the first group and the second group the first sensor value of the predetermined section belongs to.

7. The processing apparatus according to claim 6,
wherein the predetermined apparatus comprises a second sensor different from the first sensor configured to output a second sensor value in correspondence with the operation of the predetermined apparatus, and
wherein the processing portion:
obtains the second sensor value in a same time series as the first sensor value; and
outputs predetermined data in a case where a difference between a first reference value and the second sensor value corresponding to the first sensor value, that has been specified as belonging to the first group, of the predetermined section is larger than a first predetermined value.

8. The processing apparatus according to claim 6, wherein the processing portion specifies, in accordance with which of the first group and the second group the first sensor value of the predetermined section belongs to, a type of the operation performed by the predetermined apparatus.

9. The processing apparatus according to claim 7, wherein the processing portion outputs the predetermined data in a case where a difference between a second reference value and the second sensor value of corresponding to the first sensor value, that has been specified as belonging to the second group, of the predetermined section is larger than a second predetermined value.

10. The processing apparatus according to claim 7,
wherein the second sensor is a current sensor configured to output a signal corresponding to a current supplied to a motor that drives the predetermined part, and
wherein the second sensor value is a current value of the current sensor.

11. The processing apparatus according to claim 7, wherein the processing portion obtains the first reference value from the second sensor value corresponding to the sectionalized first sensor value belonging to the first group.

12. The processing apparatus according to claim 7, further comprising a device configured to issue warning in response to input of the predetermined data from the processing portion.

13. The processing apparatus according to claim 9, wherein the second reference value is set on a basis of at least one of a standard value and a simulation value in the operation of the predetermined apparatus.

14. The processing apparatus according to claim 1, wherein the processing portion performs clustering by compressing the sectionalized the first sensor value into point data.

15. The processing apparatus according to claim 1,
wherein the first sensor is an encoder configured to output a signal corresponding to the displacement of a predetermined part, and
wherein the first sensor value is an encoder value of the encoder.

16. The processing apparatus according to claim 15, wherein the encoder is a rotary encoder configured to output a signal corresponding to a rotation angle of a rotor of a motor that drives the predetermined part.

17. The processing apparatus according to claim 15, wherein the processing portion sectionalizes the encoder value by obtaining a displacement velocity of the predetermined part on a basis of the encoder value and extracting, from the encoder value, a section where a value of the displacement velocity deviates from a first threshold value.

18. A manufacturing system comprising:
the processing apparatus according to claim 1; and
the predetermined apparatus according to claim 1,
wherein the predetermined apparatus is a manufacturing apparatus.

19. A manufacturing method of manufacturing a product by using the manufacturing system according to claim 18.

20. A robot apparatus comprising:
the processing apparatus and the predetermined apparatus according to claim 1,
wherein the predetermined apparatus is a robot arm.

21. The processing apparatus according to claim 1, wherein the degree of change is a temporal change in the operation.

22. The processing apparatus according to claim 1, wherein the processing portion obtains the first sensor value in time series, and sectionalizes the first sensor value in the time series.

23. The processing apparatus according to claim 1, wherein the predetermined apparatus includes a predetermined portion, and the operation is an operation to displace the predetermined portion by the predetermined apparatus.

24. The processing apparatus according to claim 1, wherein the second operation is an adaptive operation.

25. The processing apparatus according to claim 1, wherein the first operation is an operation that repeatedly reproduces an operation taught by a user.

26. The processing apparatus according to claim 1, wherein the second operation is a different operation each time.

27. The processing apparatus according to claim 11, wherein the processing portion obtains the first reference value on a basis of at least one of a representative value, a median, and an average value of the second sensor value corresponding to the sectionalized first sensor value belonging to the first group.

28. The processing apparatus according to claim 8, wherein the type is a first type as an operation that is repeated each time, or a second type as an operation that is performed randomly.

29. The processing apparatus according to claim 23, wherein the predetermined apparatus is a robot, and the predetermined portion is an end effector.

30. A processing method for a processing portion, the processing method comprising:
    obtaining a first sensor value of a first sensor output from a predetermined apparatus comprising the first sensor in correspondence with an operation of the predetermined apparatus;
    obtaining a change of the first sensor value on a basis of the first sensor value;
    sectionalizing the first sensor value on a basis of the change of the first sensor value; and
    sectionalizing the first sensor value into a first operation that causes the predetermined apparatus to repeatedly reproduce the operation and a second operation that does not cause the predetermined apparatus to repeatedly reproduce the operation on a basis of a degree of change in displacement of the predetermined apparatus.

31. The processing method according to claim 30, wherein the obtaining includes obtaining a degree of change by differentiating the first sensor value, and the sectionalizing includes extracting and sectionalizing a section where the degree of change deviates from a first threshold from the first sensor value.

32. A computer-readable non-transitory recording medium storing a program for causing a computer to perform the processing method according to claim 30.

33. The processing method according to claim 30, wherein the processing method further comprises classifying the sectionalized first sensor value into a first group or a second group.

34. A processing apparatus comprising:
a processing portion,
wherein the processing portion:
obtains a first sensor value of a first sensor output from a predetermined apparatus comprising the first sensor in correspondence with an operation of the predetermined apparatus;
obtains a degree of change in the operation on a basis of the first sensor value;
sectionalizes the first sensor value on a basis of the degree of change; and
clusters the sectionalized first sensor value,
wherein the processing portion classifies, by clustering, the sectionalized first sensor value into a first cluster whose variance is equal to or smaller than a second threshold value or a second cluster whose variance is larger than the second threshold value,
wherein the processing portion further obtains the first sensor value of a predetermined section from the predetermined apparatus, and specifies which of the first cluster and the second cluster the first sensor value of the predetermined section belongs to,
wherein the predetermined apparatus comprises a second sensor different from the first sensor configured to output a second sensor value in correspondence with the operation of the predetermined apparatus, and
wherein the processing portion:
obtains the second sensor value in a same time series as the first sensor value; and
outputs predetermined data in a case where a difference between a first reference value and the second sensor value corresponding to the first sensor value, that has been specified as belonging to the first cluster, of the predetermined section is larger than a first predetermined value,
wherein the processing portion obtains the first reference value from the second sensor value corresponding to the sectionalized first sensor value belonging to the first cluster, and
wherein the processing portion obtains the first reference value on a basis of at least one of a representative value, a median, and an average value of the second sensor value corresponding to the sectionalized first sensor value belonging to the first cluster.

* * * * *